(12) United States Patent
Minamide et al.

(10) Patent No.: US 7,869,706 B2
(45) Date of Patent: Jan. 11, 2011

(54) SHOOTING APPARATUS FOR A MICROSCOPE

(75) Inventors: Takeshi Minamide, Tokyo (JP); Yujin Arai, Tokyo (JP)

(73) Assignee: Olympus Corporation, Tokyo (JP)

( * ) Notice: Subject to any disclaimer, the term of this patent is extended or adjusted under 35 U.S.C. 154(b) by 118 days.

(21) Appl. No.: 12/327,859

(22) Filed: Dec. 4, 2008

(65) Prior Publication Data

US 2009/0148153 A1 Jun. 11, 2009

(30) Foreign Application Priority Data

Dec. 6, 2007 (JP) .............................. 2007-315795

(51) Int. Cl.
*G02B 21/36* (2006.01)
*G02B 23/00* (2006.01)
*G02B 7/04* (2006.01)
*G02B 27/64* (2006.01)
*G06K 9/40* (2006.01)

(52) U.S. Cl. ........................... 396/432; 396/5; 359/380; 250/201.3; 382/255

(58) Field of Classification Search ................. 396/432, 396/5; 359/380; 250/201.3; 382/255
See application file for complete search history.

(56) References Cited

U.S. PATENT DOCUMENTS

| 5,680,484 A | * | 10/1997 | Ohyama et al. | ............. 382/255 |
| 2007/0081231 A1 | * | 4/2007 | Shirota et al. | ............... 359/380 |

FOREIGN PATENT DOCUMENTS

JP        2002-350741 A        12/2002

\* cited by examiner

*Primary Examiner*—Rochelle-Ann J Blackman
(74) *Attorney, Agent, or Firm*—Holtz, Holtz, Goodman & Chick, PC

(57) ABSTRACT

A camera head acquires a sample image by shooting a scaled up image of a sample obtained by a microscope body. A memory device records the sample image in a record medium. A CPU detects the completion of the sighting on an observed portion of a sample in a microscope body on the basis of a R. G. B data value of each pixel configuring a microscope image detected by the R. G. B data value. Furthermore, the CPU detects the completion of the focusing on the observed portion by the microscope boundary on the basis of the height of the contrast of the microscope image detected by the focusing completion detection unit. When both completion of the sighting and completion of focusing are detected, the CPU controls a memory device to record a sample image acquired by a camera head on a record medium.

8 Claims, 15 Drawing Sheets

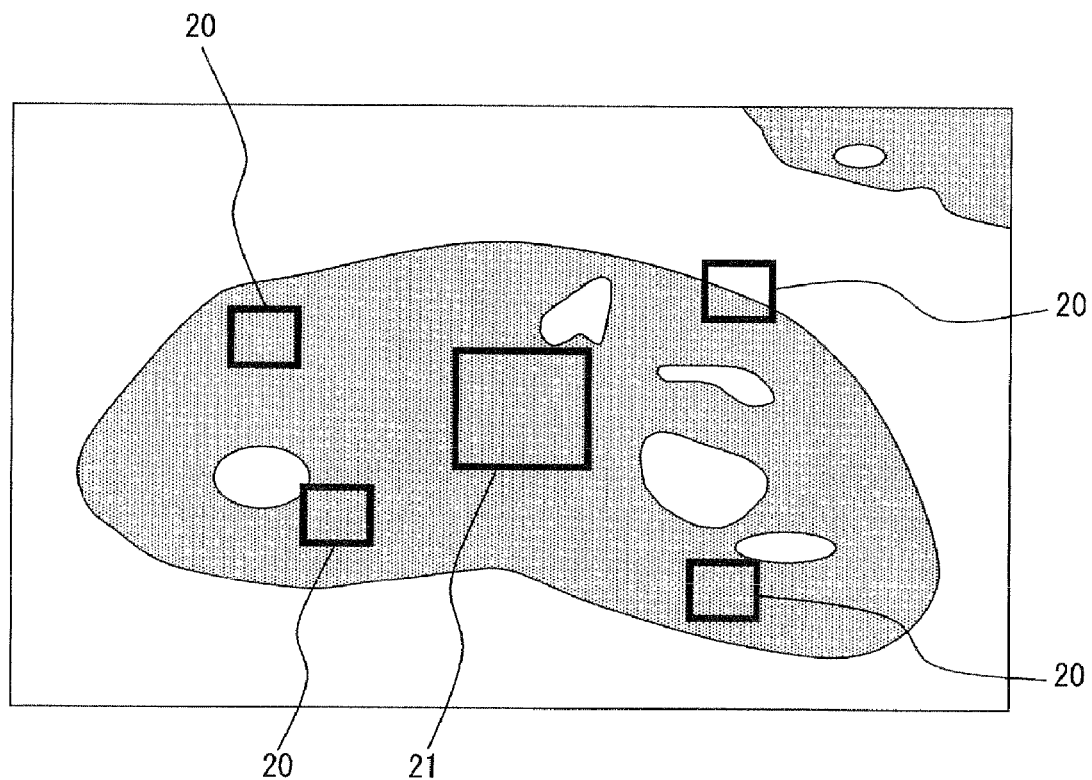
F I G. 3

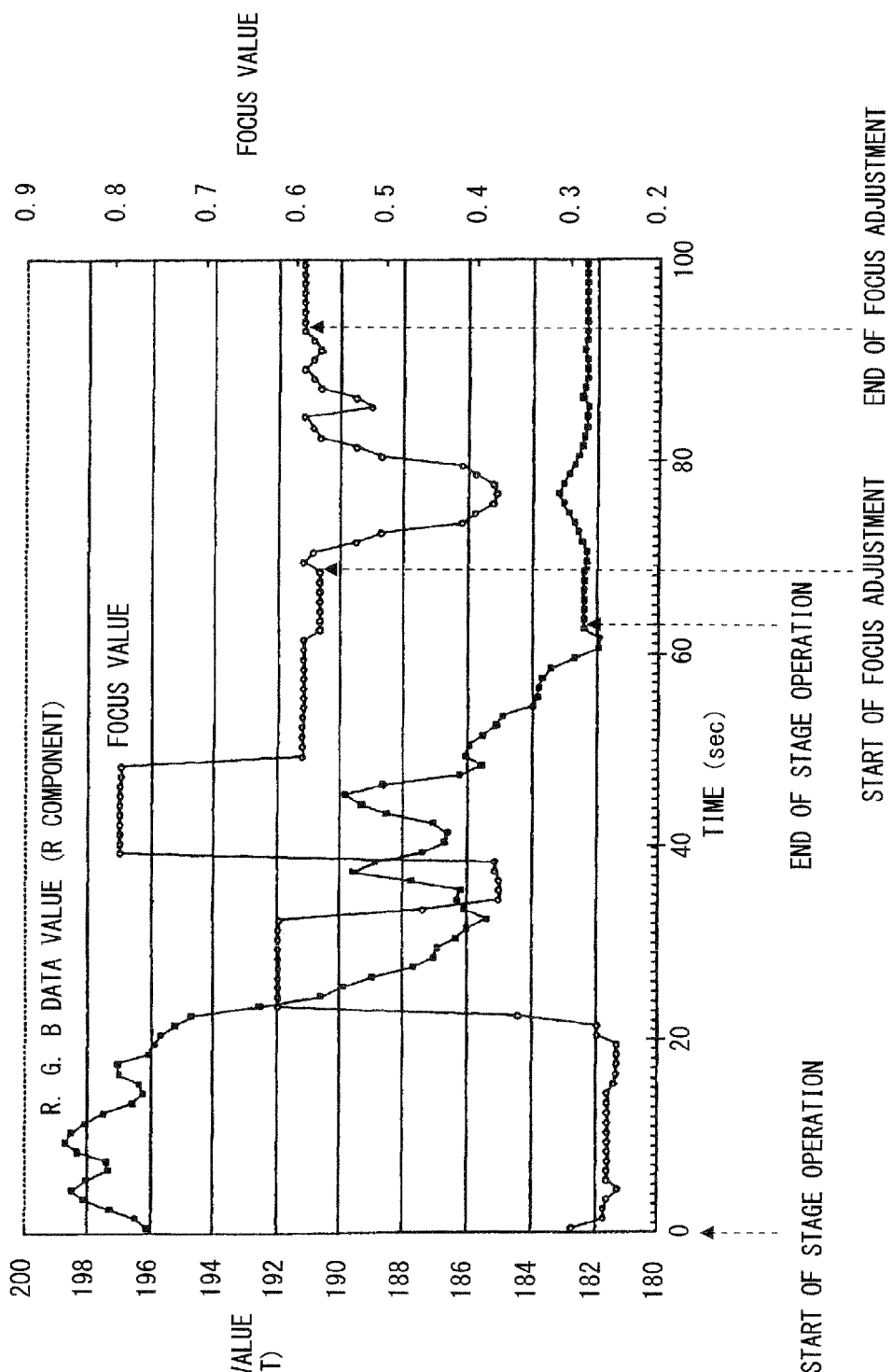
F I G. 4

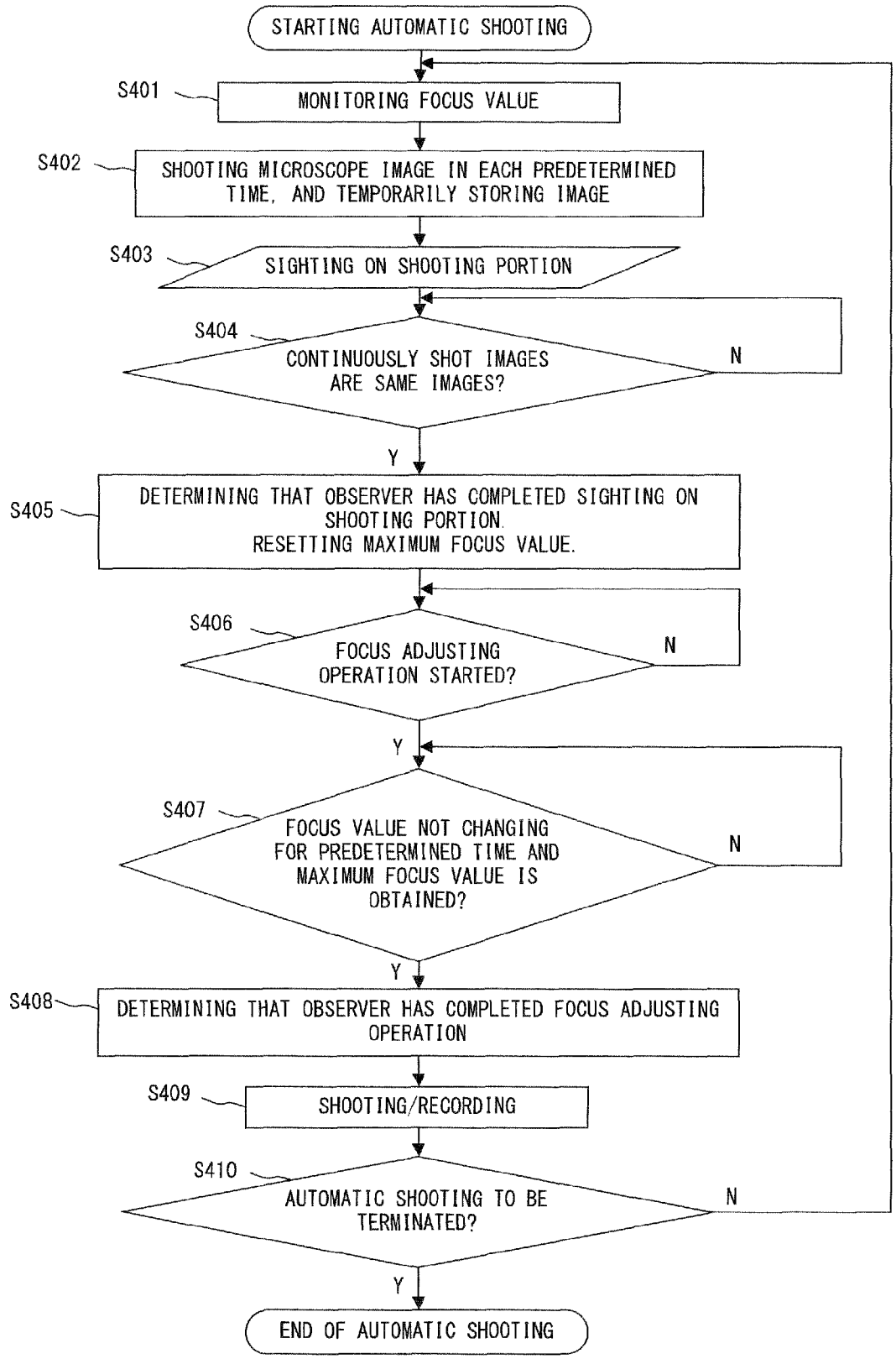
F I G. 1 2

SHOOTING APPARATUS FOR A MICROSCOPE

CROSS REFERENCE TO RELATED APPLICATIONS

This application claims benefit of Japanese Application No. 2007-315795, filed Dec. 6, 2007, the contents of which are incorporated by this reference.

BACKGROUND OF THE INVENTION

1. Field of the Invention

The present invention relates to microscope technology, and more specifically to the technology of acquiring a sample image by shooting a scaled up image of a sample obtained by a microscope.

2. Description of the Related Art

Recently, with the widespread use of a high-performance digital camera, a digital camera can be directly connected to a microscope to shoot a scaled up image of a sample. In this case, the digital camera is connected to an external control device such as a personal computer (hereinafter referred to as a "PC") to mainly control the operation a digital camera and the shooting using the digital camera.

For example, Japanese Published Patent Application No. 2002-350741 discloses the technology of shooting a scaled up image of a sample using a digital camera directly connected to a microscope under the control of an external control device such as a PC etc. The digital camera has a camera head as a shooting device, and is connected to an operation unit such as a PC etc. provided with a control unit of a camera via a cable. The digital camera is connected to an image display device such as a display unit etc. via a cable to display a shot image. The digital camera can record acquired shot images on a hard disk in a PC or a record medium connected to an operation unit of a memory card etc. In the digital camera, a control unit of a camera head is provided only in the operation unit. Therefore, an observer operates both microscope and digital camera to shoot a scaled up image of a sample and record a sample image.

SUMMARY OF THE INVENTION

A shooting apparatus for a microscope as one of the aspects of the present invention includes: a shooting unit for acquiring a sample image by shooting a scaled up image of a sample obtained by a microscope; a record unit for recording the sample image; a sighting completion detection unit for detecting the completion of the sighting on an observed portion of the sample by the microscope; a focusing completion detection unit for detecting the completion of the focusing on the observed portion by the microscope; and a control unit for recording the sample image acquired by the shooting unit on the record unit when both completion of the sighting and completion of the focusing are detected.

A shooting apparatus for a microscope as another aspect of the present invention includes: a shooting unit for acquiring a sample image by shooting a scaled up image of a sample obtained by a microscope; a sighting completion detection unit for detecting the completion of the sighting on an observed portion of the sample by the microscope; a focal position moving operation completion detection unit for detecting the completion of a moving operation of a focal position on the sample; a control unit for sequentially acquiring the sample image in a time series by allowing the shooting unit to sequentially shoot an image when the completion of the sighting is detected; and a composite image generation unit extracting a pixel having the highest contrast from among the pixels in the same position among the sample images in the time series acquired by the shooting unit by the detection of the completion of the moving operation of the focal position, arranging the extracted pixel in the position, and generating a composite image.

BRIEF DESCRIPTION OF THE DRAWINGS

The present invention will be more apparent from the following detailed description when the accompanying drawings are referenced.

FIG. 3 shows an example of the display on a live image in the R. G. B detection area and the focus area;

FIG. 4 shows an example of a monitoring result of the R. G. B data value and the focus value;

FIG. 12 is a flowchart showing the process contents of the fourth example of the automatic shooting mode process;

DESCRIPTION OF THE PREFERRED EMBODIMENTS

The embodiments of the present invention are described below with reference to the attached drawings.

Figure 1:
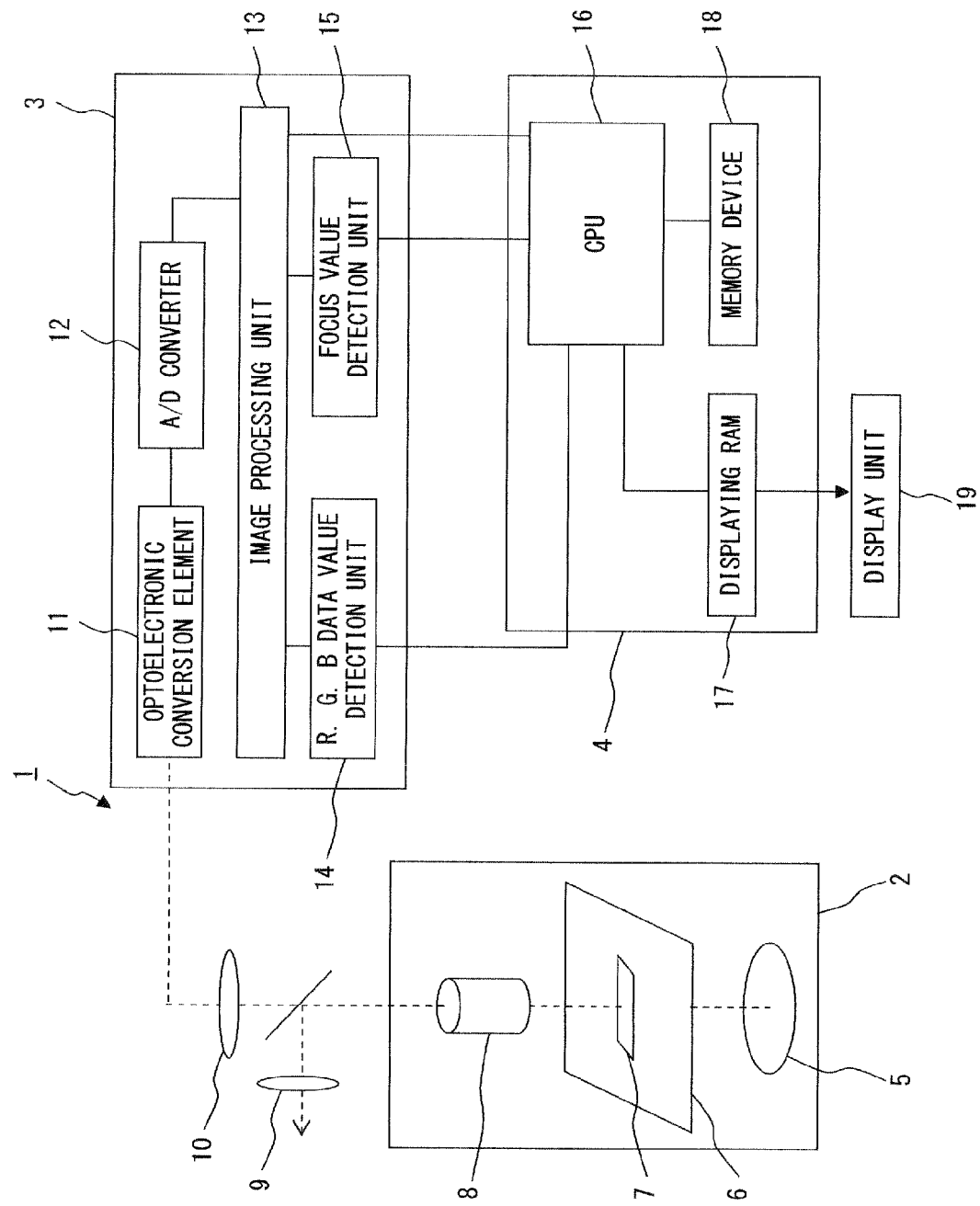
FIG. 1 shows the configuration of the microscope image shooting system according to the first embodiment of the present invention.

First, the configuration shown in FIG. 1 is described. FIG. 1 shows the configuration of the microscope image shooting system according to the first embodiment of the present invention.

A microscope image shooting system 1 is configured by a microscope body 2, a camera head 3, a control unit 4, and a display unit 19. In the configuration, the camera head 3 and the control unit 4 form a shooting apparatus for a microscope embodying the present invention.

In the microscope body 2, the light from a light source 5 reaches a sample 7 on a stage 6. Then, an image of the sample 7 is scaled up at a desired magnification by an object lens 8. Afterwards, the scaled up image of the sample 7 is divided into two optical paths. One is led to an eye piece 9, and the other is introduced to the camera head 3 through an imaging lens 10. The stage 6 can be moved in the X direction and the Y direction that are orthogonal to each other on a plane perpendicular to the optical axis of the microscope body 2. In the microscope body 2, the relative distance between the stage 6 and the object lens 8 can be changed in the Z direction as the direction of the optical axis in the state in which the sample 7 is placed on the stage 6.

The camera head 3 shoots the scaled up image of the sample 7 obtained by the microscope body 2, and acquires its microscope image (sample image). Furthermore, the camera head 3 acquires data for detection of the completion of the sighting on the observed portion of the sample 7 by the microscope body 2, and acquires data for detection of the completion of the focusing on the observed portion by the microscope body 2.

The camera head 3 is provided with an optoelectronic conversion element 11, an A/D converter 12, an image processing unit 13, an R. G. B data value detection unit 14, and a focus value detection unit 15, and is connected to the control unit 4 via a communication cable.

The optoelectronic conversion element 11 performs an optoelectronic conversion on a scaled up image of the sample 7 obtained by the microscope body 2, and outputs an electric signal representing the microscope image (sample image), and can be, for example, a CCD (charge-coupled device). The A/D (analog-digital) converter 12 converts the electric signal as an analog signal output from the optoelectronic conversion element 11 into digital data. The image processing unit 13 performs various image processes on the microscope image represented by the digital data output from the A/D converter 12.

The R. G. B data value detection unit 14 detects an R. G. B data value for each pixel configuring a microscope image. An R. G. B data value is a value indicating the level of the three primary elements of light (R: red, G: green, and B: blue).

The focus value detection unit 15 detects the focus value of the microscope image. A focus value indicates the level of the focal status of the microscope image. In the present embodiment, the focus value indicates the level of the contrast of a microscope image, and is a value indicating the difference between the highest intensity and the lowest intensity of a pixel included in predetermined area of a microscope image. When the difference value is the maximum value, that is, the contrast is the highest, the microscope image is evaluated that it is in the focal status.

The control unit 4 controls the entire operation of the microscope image shooting system 1. That is, for example, the control unit 4 detects the completion of the sighting on the observed portion of the sample 7 by the microscope body 2, and detects the completion of the focusing on the observed portion by the microscope body 2 on the basis of the data acquired by the camera head 3. Then, the control unit 4 controls the shooting by the camera head 3 when both completion of the sighting and completion of the focusing are detected, and controls record of the sample image acquired by the shooting.

The control unit 4 includes a CPU 16, a displaying RAM 17, and a memory device 18.

The CPU (central processing unit) 16 includes an MPU (main processor unit), ROM (read only memory), and RAM (random access memory), and controls the entire operation of the microscope image shooting system 1. The MPU performs various controlling processes. The ROM stores in advance a control program executed by the MPU to enable the controlling process to be performed. The RAM is used as a working storage device when the MPU executes the control program.

The displaying RAM 17 is memory to which data indicating images and information is written when various images and information is displayed on a display unit 19.

The memory device 18 performs a recording process and a reading process of various images and information on a record medium (riot shown in the attached drawings) such as a memory card etc.

Various operations by an observer is analyzed and processed by the CPU 16. For example, when control of shooting is performed, the CPU 16 outputs a control instruction on a exposure time to the camera head 3 while controlling the memory device 18 to write image data transmitted from the image processing unit 13 of the camera head 3 to a record medium. The microscope image shooting system 1 has an automatic shooting mode as an operation mode in which microscope image can be shot without operating the camera head 3 and the control unit 4. In the automatic shooting mode, the display unit 19 can display moving pictures (live display) of sample images. An observer can recognize the completion of the sighting on an observed portion of the sample 7 by the microscope body 2 and the completion of the focusing on the observed portion by the microscope body 2 by referring to the live display.

According to the present embodiment, the control unit 4 can be a PC having a standard configuration. A PC of a standard configuration has, for example, an MPU, main memory, an input unit, an interface unit, an auxiliary storage device, etc. The MPU controls the entire operation of the microscope image shooting system 1 by executing a control program. The main memory is used as working memory by the MPU as necessary. The input unit such as a mouse device, a keyboard device, etc. acquires various instructions from a user. The interface unit manages communication of various data with the microscope image shooting system 1. The auxiliary storage device such as a hard disk device etc. stores various programs and data.

The display unit 19 is a display device such as a liquid-crystal display, etc.

Described next is the operation of the microscope image shooting system 1 according to the present embodiment with the above-mentioned configuration.

When a scaled up image of the sample 7 on the stage 6 of the microscope body 2 enters the camera head 3 through the imaging lens 10, and an image is formed on the photoreception surface of the optoelectronic conversion element 11, the optoelectronic conversion element 11 converts the sample image into an electric signal. Then, after the electric signal is converted by the A/D converter 12 sequentially into digital data, the data is input to the image processing unit 13 and an image processing is performed. Thus, the digital image data of a sample image that can be displayed on the display unit 19 is generated and transmitted to the control unit 4 via a communication cable. When the CPU 16 stores the digital image data in the displaying RAM 17, the display unit 19 reads a signal of the digital image data signal from the displaying RAM 17, and displays a live sample image.

When a microscope image is shot, an observer operates the control unit 4 and issues a predetermined instruction to the CPU 16. Upon receipt of the instruction, the CPU 16 transmits the digital image data output from the image processing unit 13 to the memory device 18, controls the memory device 18 and stores the digital image data on a record medium.

Described next is the operation during automatic shooting by the microscope image shooting system 1 according to the present embodiment.

Figure 2:
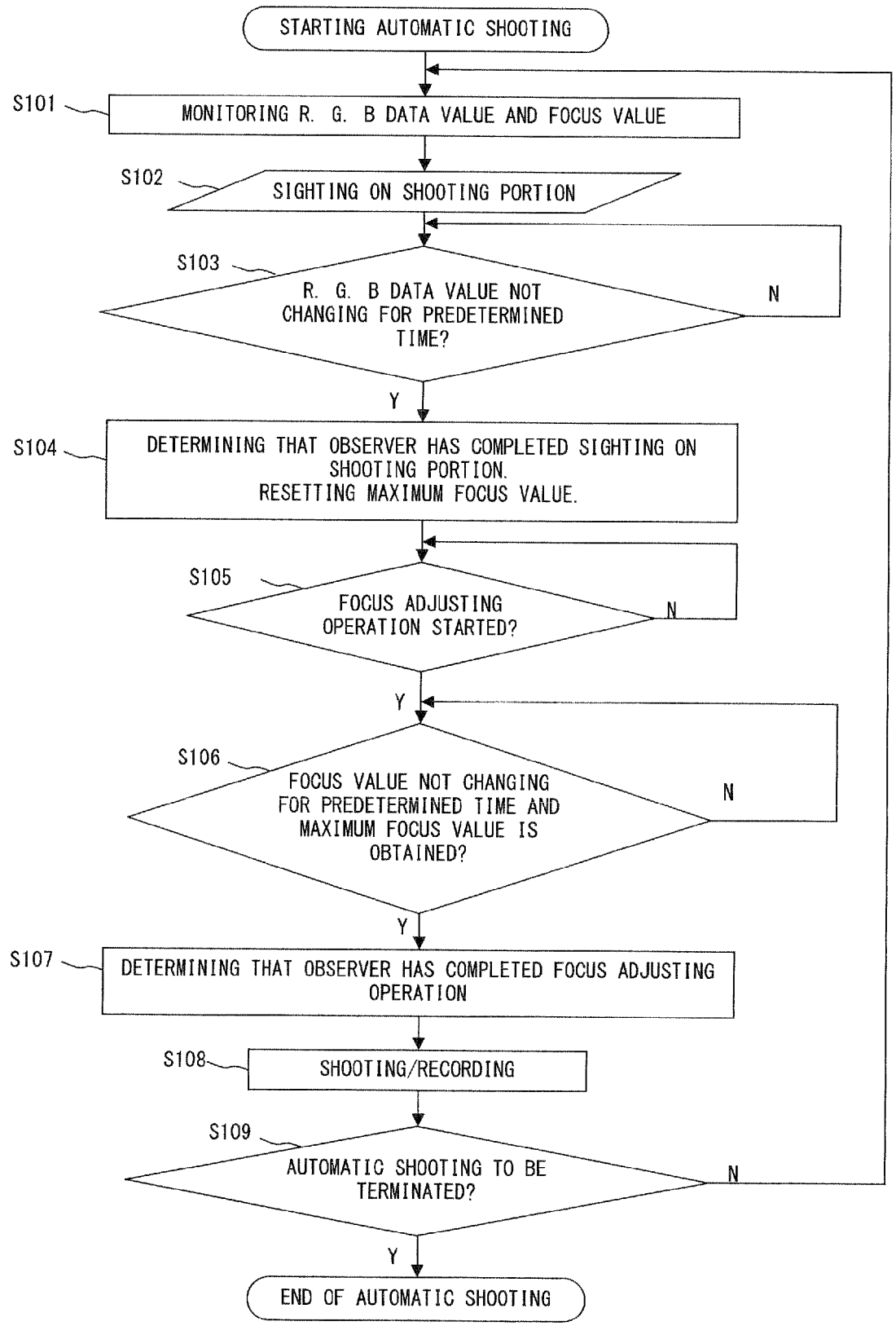
FIG. 2 is a flowchart showing the process contents of the first example of the automatic shooting mode process.

The process shown in FIG. 2 is described below. FIG. 2 is a flowchart showing the process contents of the automatic shooting mode process performed by the CPU 16 of the control unit 4 in the microscope image shooting system 1 shown in FIG. 1. The process only in S102 shown in FIG. 2 is the operation performed by an observer.

The CPU 16 can performing the above-mentioned process by reading and executing the control program stored in its own ROM.

The process shown in FIG. 2 is started when the CPU 16 acquires an instruction to select the automatic shooting mode as an operation mode to be operated by an observer using the control unit 4.

First, in S101 shown in FIG. 2, performed is the process of monitoring the R. G. B data values and the focus values of scaled up images in a time series acquired by the camera head 3 sequentially shooting displayed live microscope images, that is, scaled up images of the sample 7 obtained by the microscope body 2.

As described above, the R. G. B data value is detected by the R. G. B data value detection unit 14. The R. G. B data value is detected from the pixels configuring an image in a predetermined area set in advance by an observer on a microscope image. Relating to the size of the area a pixel through the entire microscope image can be set. The CPU 16 defines the R. G. B data value of a microscope image by summing up for each color of the entire set area for which the R. G. B data values are set for each of the obtained pixels.

An observer can arbitrarily set the area of a microscope image from which the R. G. B data values are to be detected. In this case, for example, as shown in FIG. 3, it is convenient that the area set by the observer is displayed on a live image as an R. G. B detection area (sighting completion detection area) 20.

As described above, a focus value is detected by the focus value detection unit 15. An observer can arbitrarily set an area on a microscope image from which a focus value (in the present embodiment, a contrast value as described above) is to be detected. In this case, as shown in FIG. 3 for example, it is convenient to display an area set by an observer to display as a focus area (focusing completion detection area) 21 on a live image.

FIG. 4 shows an example of a monitoring result of an R. G. B data value and a focus value in the monitoring process in S101. In FIG. 4, for example, only the R component in the R. G. B data value is displayed, but it is assumed that actually the G component and the B component are similarly monitored.

In the example shown in FIG. 4, the R. G. B data value and the focus value are largely fluctuated in the operation of the stage 6 on which the sample 7 are loaded.

When the operation of the stage 6 for sighting on the observed portion of the sample 7 is completed in the microscope body 2 (63 seconds after starting the operation of the stage as shown in FIG. 4), the vision of the microscope image is fixed to the observed portion. Afterwards, there is almost no change of the R. G. B data value. Therefore, it is to be detected that the amount of change of an image in the R. G. B detection area 20 (that is, an amount of change of at least one of the R. G. B data values in the R. G. B detection area 20) has continuously stayed in a predetermined range (zero in the present embodiment) for a predetermined time. In the present embodiment, the completion of the sighting on the observed portion is detected by the above-mentioned detection.

Next, after completing the sighting on the observed portion, the focus adjusting operation on the microscope body 2 (adjusting operation for focusing the observed portion on the focus position of the object lens 8) is started. Then, the focus value greatly fluctuates with the focus adjusting operation.

When the focus adjusting operation is completed, there is almost no change of the focus value (that is, a change of a contrast value). Then, after detecting the completion of the sighting, it is detected that the focus value (that is, the contrast value) has stayed within a predetermined range (zero in the present embodiment) from the maximum value (that is, the highest contrast value) for a predetermined time. In the present embodiment, by perform the detection, the completion of the focusing on the observed portion can be detected. To attain this, the CPU 16 stores the maximum value of the focus value in the monitoring process in S101.

The CPU 16 sequentially performs the monitoring process in S101 until the automatic shooting mode process is completed each time a new sample image is acquired from the image processing unit 13.

In the example shown in FIG. 4, the focus value fluctuates during the operation of the stage 6 because the contrast changes with the image displayed on the focus area 21. The R. G. B data value fluctuates during the focus adjusting operation because the intensity of a microscope image changes in the focus adjusting operation.

Back in FIG. 2, in S102, an observer performs the moving operation of the stage 6 of the microscope body 2 to perform the sighting on an observed portion of the sample 7.

In S103, it is determined whether or not a change of the R. G. B data values of the sample image in a time series within a predetermined time is in a predetermined range (whether or not a change has occurred in the present embodiment). If it is determined that the change is in a predetermined range (no change according to the present embodiment) (YES as a determination result), then control is passed to S104. On the other hand, if it is determined that the change has exceeded the predetermined range (a change detected according to the present embodiment) (NO as a determination result), then it is assumed that the operation for the sighting on the observed portion has not been completed, and the process is repeated until the determination result becomes YES.

The determining process in S103 is performed on the basis of the amount of change per unit time of the R. G. B data value.

Figure 5:
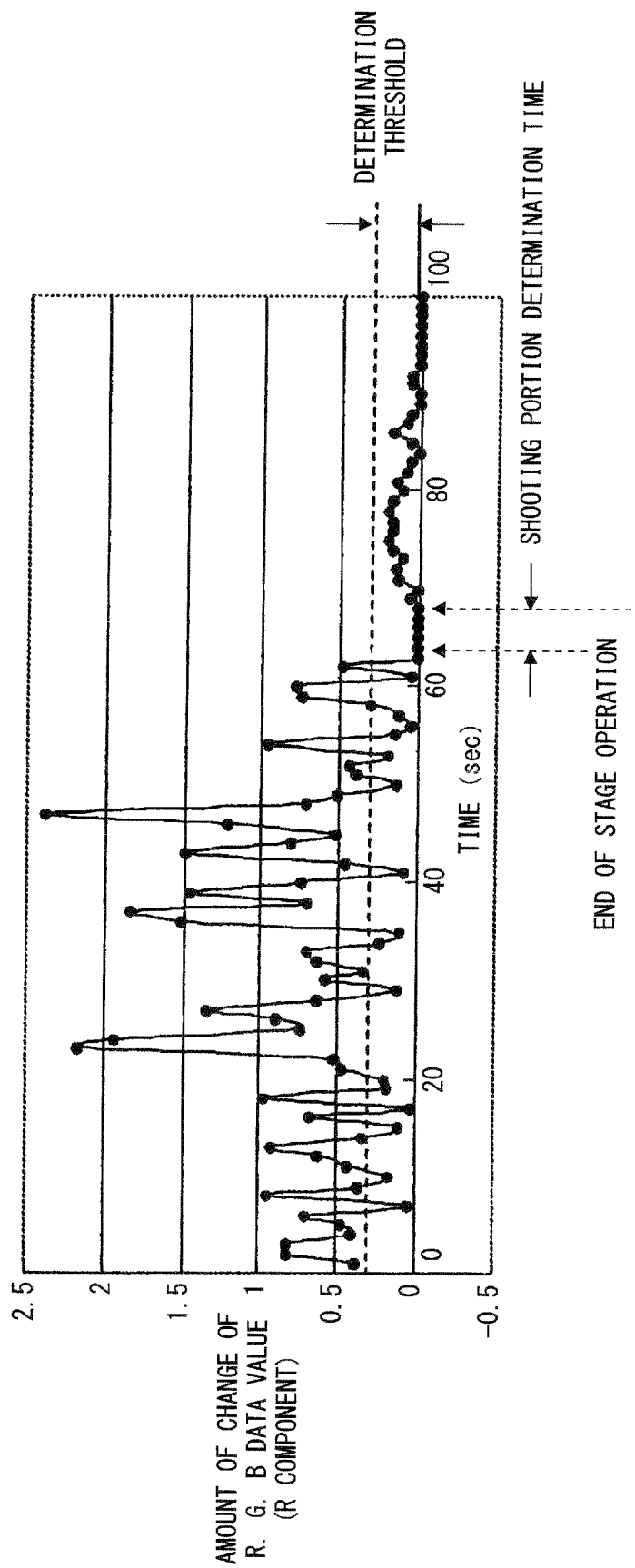
FIG. 5 shows an example of an amount of change of the R. G. B data value generated in the operation on a microscope body 2.

Described below is the example shown in FIG. 5. FIG. 5 shows an example of an amount of change of the R. G. B data value made in the operation of the microscope body 2.

In the graph shown in FIG. 5, the vertical axis indicates the level of the amount of change of the R. G. B data value, and the horizontal axis indicates the elapsed time (t). In FIG. 5, an amount of change of the R component in the R. G. B data value is displayed.

The amount of change of the R. G. B data value shown in FIG. 5 is a n absolute value of the difference between the R. G. B data value at time t=n and the R. G. B data value at time t=(n−1). If the value stays as zero for a predetermined time (shot portion determination time in FIG. 5), the CPU 16 determines that the R. G. B data value has not changed for a predetermined time. In the present embodiment, the CPU 16 determines that there is no change only when the amount of change is 0 in all components of the R, G, and B components of the R. G. B data value. For simplicity of the process, when the amount of change of any component of the R, G, and B components of the R. G. B data value is 0, it can be determined that there is no change. However, in this case, it is necessary to note that there is a strong possibility that the completion of sighting is erroneously detected.

In the present embodiment, an observer arbitrarily sets the predetermined time (setting a shot portion determination time in FIG. 5) when it is determined whether or not a change in a predetermined time of the R. G. B data value is in a predetermined range. Thus, the observer can improve the working efficiency by adjusting the time setting on the basis of the operating method and liking.

In addition, according to the present embodiment, the predetermined range when it is determined whether or not a change in a predetermined time of the R. G. B data value is within a predetermined range is set as zero. Instead, the value can be assumed as a value larger than zero (determination threshold in FIG. 5). Thus, an observer can appropriately detect the completion of the sighting on an observed portion although the R. G. B data value fluctuates by including noise in a microscope image.

Back in FIG. 2, it is assumed on the basis of the determination result in S103 that the operation for the sighting on an observed portion by an observer has been completed. In S104, prior to the process for detecting the completion of the sighting to be started from now on, the maximum value of the focus value stored by the CPU 16 is temporarily reset.

As described above, according to the present embodiment, since the focus value has the intensity of the contrast in the focus area 21, the value is changed if the image in the focus area 21 is different. Therefore, when the completion of the sighting on the shot portion is detected in the process in S104, the detection of the completion of the focusing on the shot portion can be appropriately performed by resetting the maximum value of the focus value.

Next, in S105, it is determined whether or not the focus adjusting operation has been started on the microscope body 2 by the observer. If it is determined that the focus adjusting operation has been started (YES as a determination result), control is passed to S106. On the other hand, if it is determined that the focus adjusting operation has not been started (NO as a determination result), the process is repeated until the determination result becomes YES.

The determination in S105 is performed by determining whether or not an increasing or decreasing change (larger than zero in the present embodiment) exceeding a predetermined range has been detected in the focus value after detecting the completion of the sighting in the process in S103.

Next, it is determined in S106 whether or not the following two conditions are satisfied. The first condition is that a change of a focus values in sample images in a time series in a predetermined time is within a predetermined range (no change in a predetermined time in the present embodiment). The second condition is that the current value of the focus value is within a predetermined range from the maximum value of the focus value stored in the monitoring process in S101 (matching the maximum value in the present embodiment). If it is determined that both first condition and second condition are satisfied (YES as a determination result), control is passed to S107. On the other hand, it is determined that at least one of the first condition and the second condition is not satisfied (NO as a determination result), the process in S106 is repeated until the determination result becomes YES.

The determination on the first condition in the determining process in S106 is performed on the basis of the amount of change a focus value per unit time.

Figure 6:
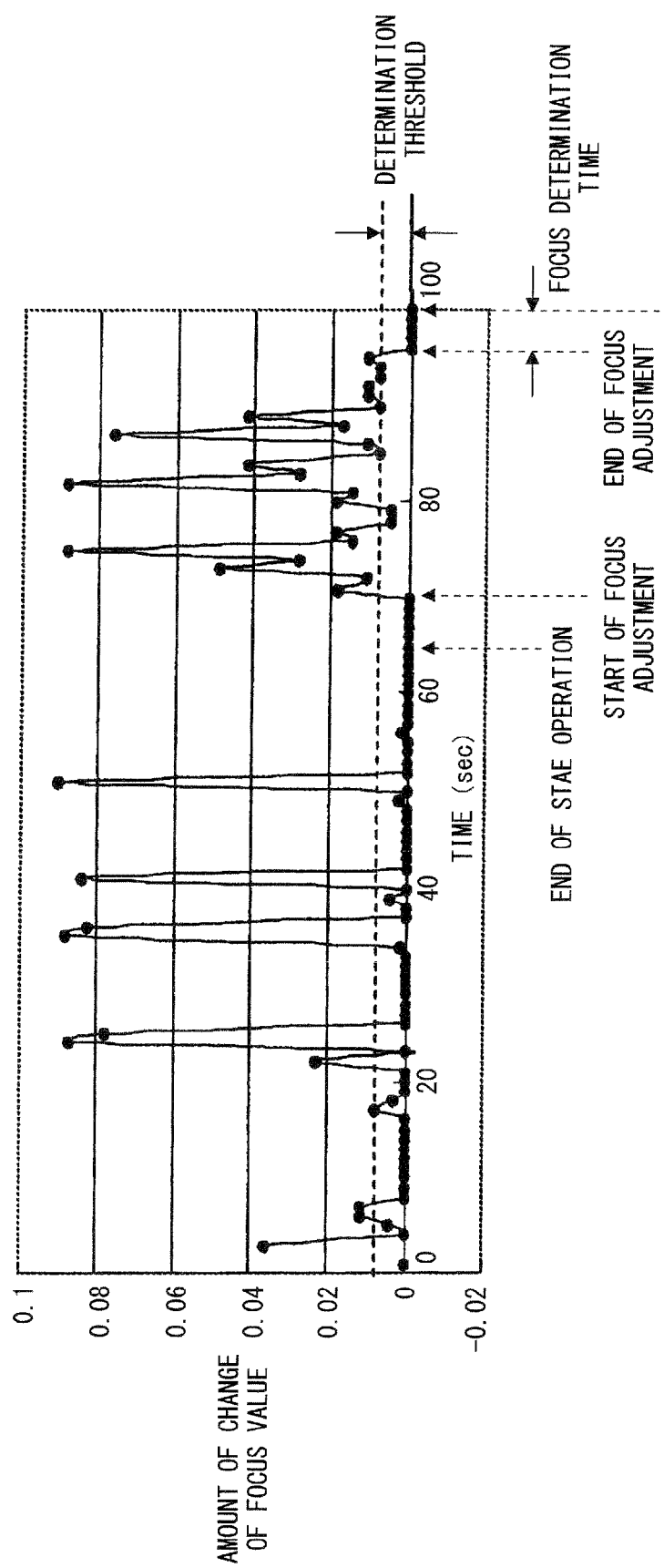
FIG. 6 shows an example of an amount of change of the focus value generated in the operation on a microscope body 2.

Described below is the example shown in FIG. 6. FIG. 6 shows an example of an amount of change of a focus value generated in the operation on the microscope body 2.

In the graph shown in FIG. 6, the vertical axis indicates the level an amount of change of a focus value, and the horizontal axis indicates an elapsed time (t).

The amount of change of the focus value shown in FIG. 6 is an absolute value of the difference between the focus value at the time t=n and the focus value at the time t=(n−1). If the value stays as zero for a predetermined time (focus determination time in FIG. 6) after the detection of the completion of the sighting, the CPU 16 determines that the focus value has not changed for a predetermined time.

In the present embodiment, an observer can arbitrarily set the predetermined time (set the focus determination time shown in FIG. 6) when it is determined whether or not the change of the focus value in a predetermined time is within a predetermined range. In the setting, the operation efficiency of the observer can be improved by adjusting the time setting on the basis of the operating method and the liking of the observer.

In the present embodiment, the predetermined range in determining whether or not the change of the focus value in a predetermined time is within a predetermined range is set as zero, but he range can be expanded over zero (determination threshold shown in FIG. 6). Thus, when the focus value fluctuates by including noise in a microscope image etc., the detection of the completion of the focusing on an observed portion by an observer can be appropriately performed.

Furthermore, in the present embodiment, the predetermined range in determining whether or not the current value of the focus value is within a predetermined range from the maximum value of the focus value is set as zero, but the range can be expanded over zero. That is, the predetermined range can be, for example, a 100% range from the 80% of the maximum value. Thus, the detection of the completion of the focusing on an observed portion by an observer can be appropriately performed when the storage contents of the maximum focus value exceed a restriction by a microscope image containing noise etc.

Back to the description in FIG. 2, in S107, it is assumed that the operation for the focusing on an observed portion by an observer has been completed on the basis of the determination result in S106, and the subsequent shooting process is started. That is, in S108, the memory device 18 is controlled, and the digital image data temporarily stored in the displaying RAM 17, that is, the digital image data representing the sample image acquired by shooting by the camera head 3, is recorded on a record medium.

Meanwhile, in S108, the camera head 3 can be controlled to shoot a scaled up image of the sample 7 to acquire a sample image, and the memory device 18 can be controlled to receive the digital image data of the acquired sample image from the image processing unit 13 and to record the data on a record medium.

Next, in S109, it is determined whether or not the microscope image shooting system 1 has received an instruction to terminate automatic shooting as an instruction by an observer operating the control unit 4. If it is determined that the instruction has been received (YES as a determination result), the automatic shooting mode process is terminated. If it is determined that the instruction has not been received (NO as a determination result), control is returned to S101 and the above-mentioned process is repeated.

The processes described above refer to the automatic shooting mode process. By performing the processes, a sample image for which the sighting and the focusing have been completed on the observed portion of the sample 7 can be recorded on a record medium without operating the camera head 3 and the control unit 4 by an observer operating the microscope body 2 only.

As described above, according to the present embodiment, since the amount of operation on the camera head 3 and the control unit 4 is reduced during shooting a microscope image, the operability of the microscope image shooting system 1 is improved. In addition, since the shooting operation can be simply performed, the working time required for the shooting operation can be shortened, and a more desirable microscope observation can be allowed for an observer.

In the present embodiment, the completion of the sighting on an observed portion of the sample 7 by the microscope body 2 is detected on the basis of the amount of change of the microscope image acquired by the camera head 3. Instead, a sensor for detecting the presence/absence of a movement of the stage 6 loaded with the sample 7 by the microscope body 2 is provided to detect the completion of the sighting by the sensor detecting that the stage 6 has not been moved.

Figure 7:
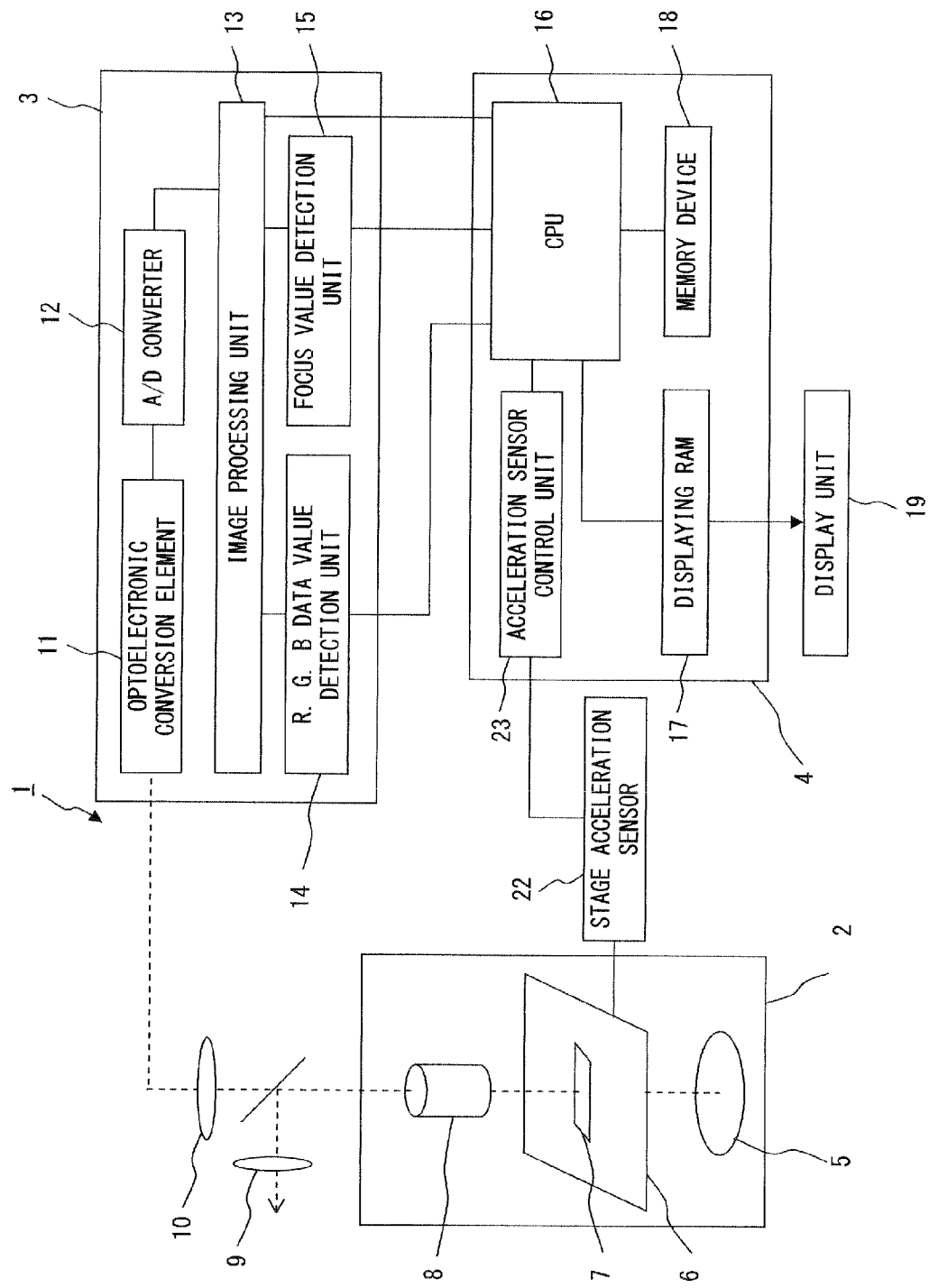
FIG. 7 shows the first variation example of the configuration of the microscope image shooting system according to the first embodiment of the present invention.

Described below is an example shown in FIG. 7. FIG. 7 shows the first variation example of the configuration of the microscope image shooting system according to the first embodiment of the present invention shown in FIG. 1.

The configuration shown in FIG. 7 is different from the configuration shown in FIG. 1 only in that a stage acceleration sensor 22 and an acceleration sensor control unit 23 are added. Described below are the different points only.

The stage acceleration sensor 22 is a sensor for detecting the acceleration when the stage 6 is moved, detects the acceleration when the stage 6 is moved, converts it into a voltage value etc., and outputs the result. The stage acceleration sensor 22 can detect the acceleration in the X direction and the Y direction independently.

The acceleration sensor control unit 23 controls the stage acceleration sensor 22, and transmits the information about the acceleration indicated by the signal output from the stage acceleration sensor 22 to the CPU 16. The CPU 16 monitors the acceleration.

Figure 8:
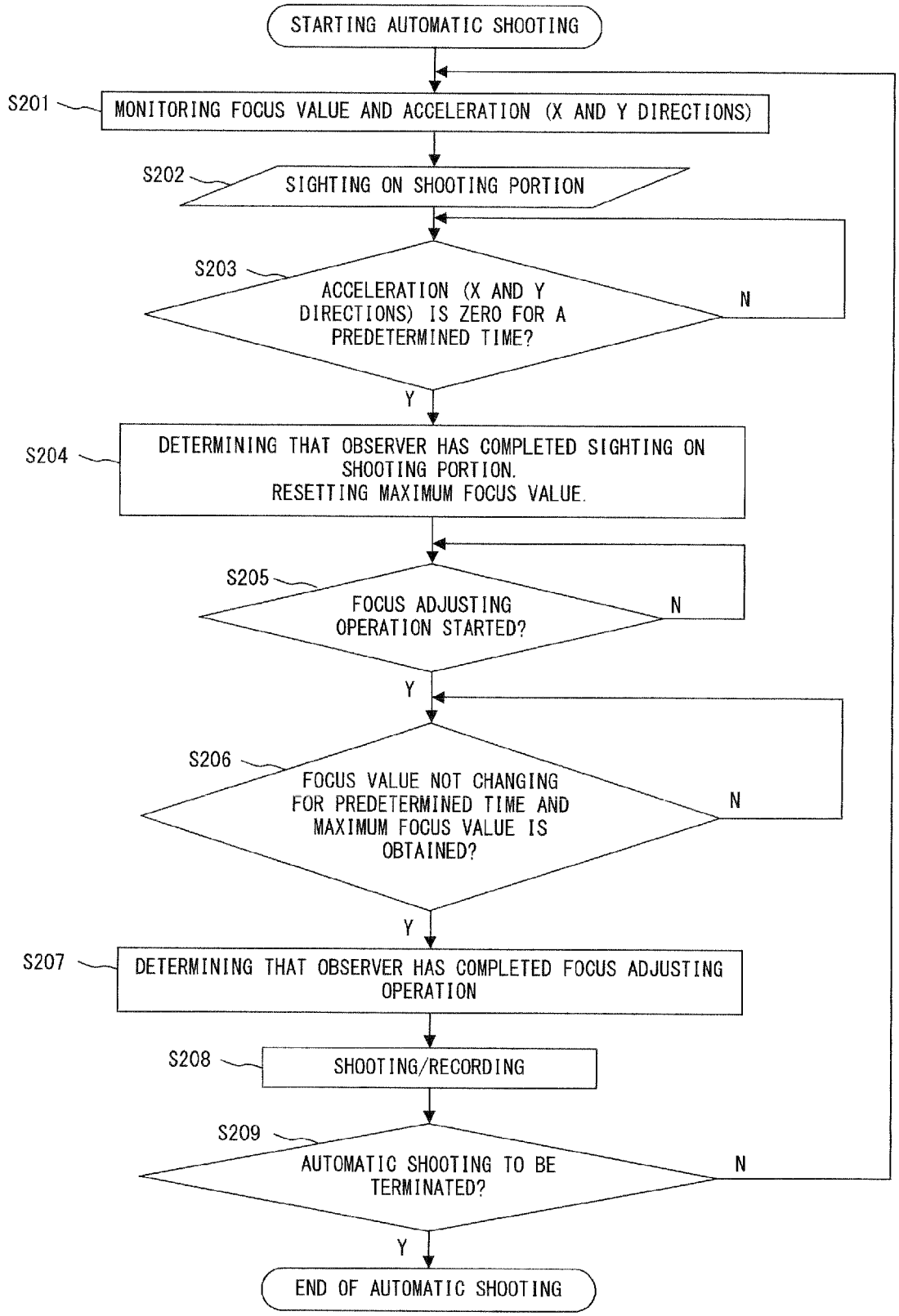
FIG. 8 is a flowchart showing the process contents of the second example of the automatic shooting mode process.

Described below is the process contents shown in FIG. 8. FIG. 8 is a flowchart showing the process contents of automatic shooting mode process performed by the CPU 16 of the control unit 4 by the microscope image shooting system 1 shown in FIG. 7. However, only S202 shown in FIG. 8 shows the operation performed by an observer.

The CPU 16 can perform the process by reading and executing the control program stored in its own ROM.

The process shown in FIG. 8 is started when an observer operates the control unit 4 and the CPU 16 acquires an instruction to select the automatic shooting mode as an operation mode.

First, performed in S201 shown in FIG. 8 is the process of monitoring the acceleration in the X direction and the Y direction of the stage 6 detected by the stage acceleration sensor 22 and the focus values of the displayed live microscope images. The displayed live microscope images are sample images in a time series acquired by the camera head 3 sequentially shooting the scaled up images of the sample 7 obtained by the microscope body 2. The acceleration of the stage 6 in the X direction and the Y direction is monitored as described above, and the focus value is monitored as with the monitoring process in S101 shown in FIG. 2.

Next, in S202, an observer moves the stage 6 of the microscope body 2 to perform sighting on an observed portion of the sample 7. At this time, the stage acceleration sensor 22 detects the acceleration depending on the movement of the stage 6. Therefore, the acceleration is intermittently detected each time the stage 6 is repeatedly moved and stopped.

In S203, it is determined whether or not a change of the monitored acceleration in a predetermined time is zero. If it is determined that the change is zero (YES as a determination result), it is assumed that the stage 6 has not moved, and control is passed to S204. If it is determined that the change is not zero (NO as a determination result), it is assumed that the operation for sighting on an observed portion has not been completed, and the process is repeated until the determination result becomes YES.

The setting of the predetermined time when it is determined whether or not a change of the acceleration in a predetermined time is within a predetermined range can be arbitrarily set by an observer. Thus, the operation efficiency of an observer can be improved by adjusting the time setting depending on the operating method and the liking of an observer.

Since the processes from S204 through S209 are the same as the processes in S104 through S109 shown in FIG. 2, the detailed descriptions are omitted here. By performing the processes, the completion of the focusing on the observed portion is detected on the basis of the monitored focus value after the completion of the sighting on an observed portion of the sample 7 is detected. Then, a sample image for which the sighting and the focusing on the observed portion are completed can be recorded on a record medium.

As described above, in the variation example, by providing a sensor for detecting the presence/absence of the movement of the stage 6 loaded with the sample 7 in the microscope body 2, and the sensor detecting that the stage 6 has not moved, thereby detecting the completion of the sighting. Thus, in addition to the effect of the first embodiment, the detection of the completion of the sighting by the R. G. B data value which is difficult for the sample 7 such as an image having a large amount of similar colors and having low contrast etc. can be appropriately performed, thereby improving the efficiency in shooting a microscope image.

In the microscope image shooting system according to the first embodiment of the present invention, when both completion of the sighting and completion of focusing on an observed portion of the sample 7 are detected, auto-bracket shooting can be performed. The auto-bracket shooting is to sequentially performing shooting by the camera head 3 while changing the setting of the shooting conditions in shooting a scaled up image of the sample 7 performed by the camera head 3.

Figure 9:
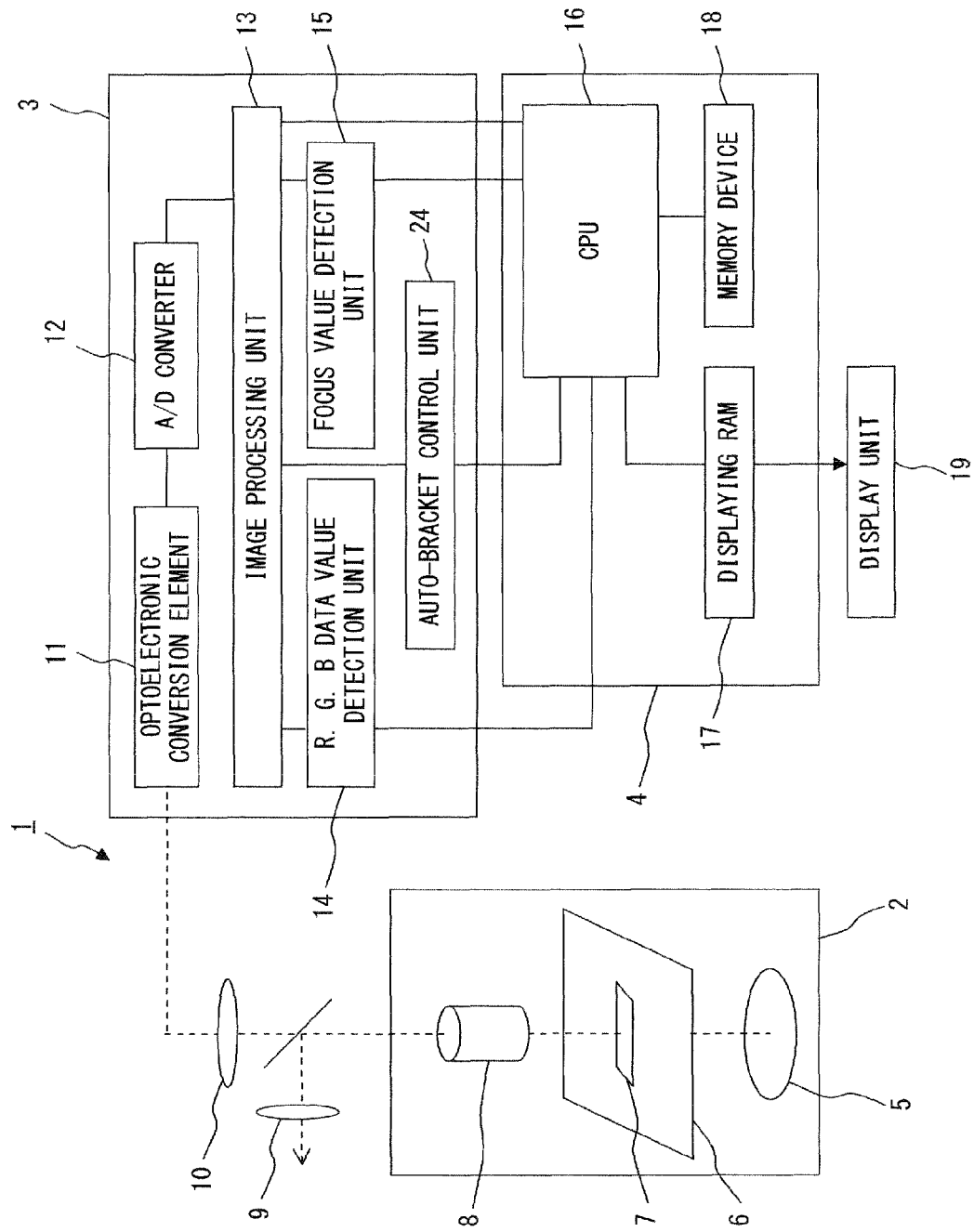
FIG. 9 shows the second variation example of the configuration of the microscope image shooting system according to the first embodiment of the present invention.

Described below is an example shown in FIG. 9. FIG. 9 shows the second variation example of the configuration of the microscope image shooting system according to the first embodiment of the present invention shown in FIG. 1.

The configuration shown in FIG. 9 is different from the configuration shown in FIG. 1 only in that an auto-bracket control unit 24 is added. Only the difference is described below.

The auto-bracket control unit 24 is connected to the image processing unit 13 and the CPU 16. The auto-bracket control unit 24 controls the auto-bracket shooting by allowing the above-mentioned auto-bracket shooting to be performed by the camera head 3 when both the completion of sighting and completion of the focusing on an observed portion of the microscope body 2 are detected.

Figure 10:
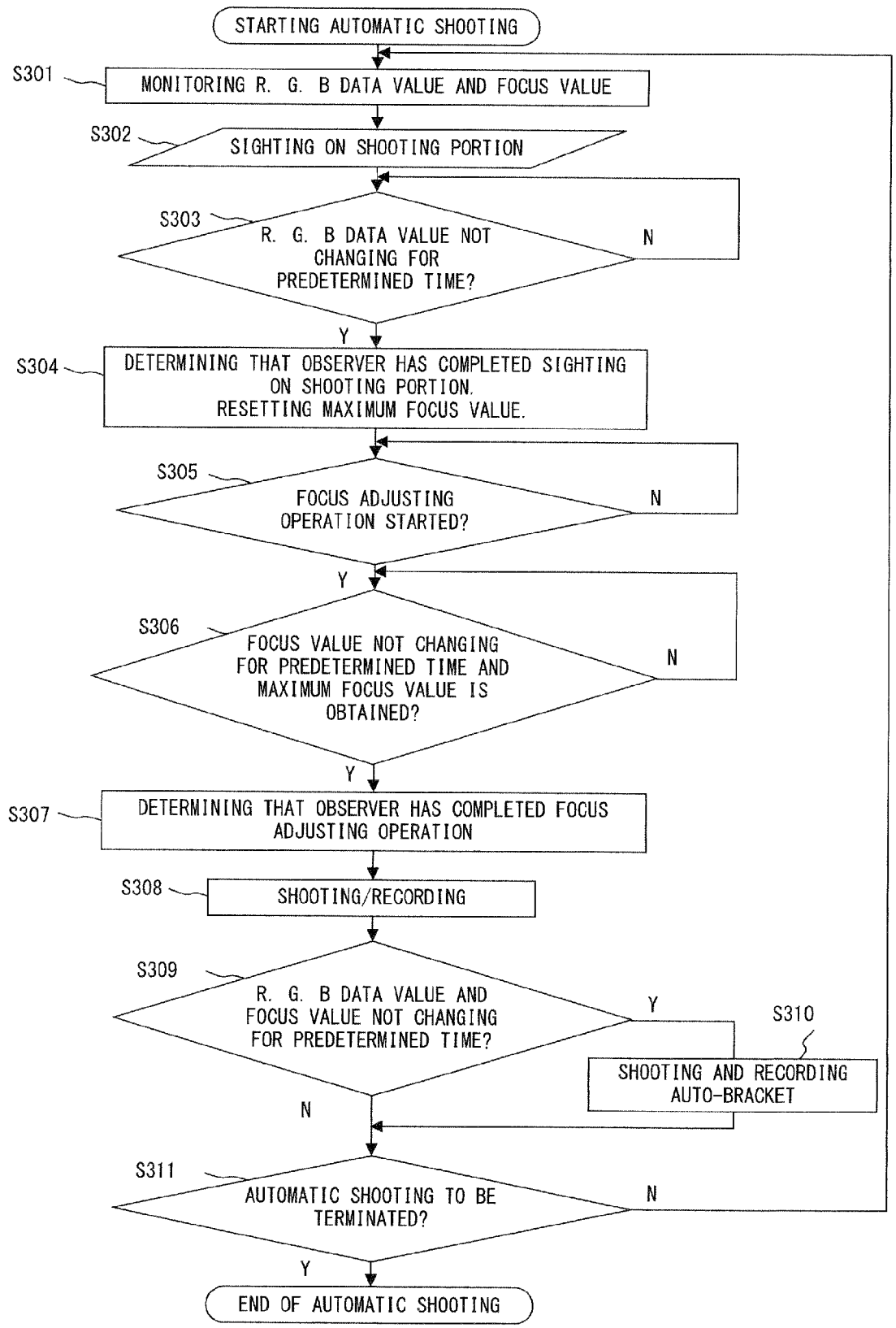
FIG. 10 is a flowchart showing the process contents of the third example of the automatic shooting mode process.

Described below is the process contents shown in FIG. 10. FIG. 10 is a flowchart of the process contents of the automatic shooting mode process performed by the CPU 16 of the control unit 4 in the microscope image shooting system 1 shown in FIG. 9. However, only S302 shown in FIG. 10 indicates the operation performed by an observer.

The CPU 16 can perform the process by reading and executing the control program stored in its own ROM.

The process shown in FIG. 10 is started when an observer operates the control unit 4 and the CPU 16 acquires an instruction to select the automatic shooting mode as an operation mode.

The processes in S301 through S308 shown in FIG. 10 are similar to the processes in S101 through S108 shown in FIG. 2. Therefore, the detailed descriptions re omitted here.

In S309 after S308, it is determined whether or not the R. G. B data values and the focus values of sample images in a time series have changed in a predetermined time after the shooting and recording process in S308. When it is determined that the R. G. B data values and the focus values are not changed (YES as a determination result), control is passed to S310. On the other hand, if it is determined that at least one of the R. G. B data value and the focus value has changed (NO as a determination result), control is passed to S311.

In S310, an instruction is issued to the auto-bracket control unit 24 to perform the auto-bracket shooting, the memory device 18 is controlled, and the digital image data of the sample image obtained by the shooting is received from the image processing unit 13, and is recorded on a record medium.

As described above, in the auto-bracket shooting, the settings of the shooting conditions for the camera head 3 in the shooting operation before the auto-bracket shooting are automatically changed by the auto-bracket control unit 24 to sequentially shoot the scaled up image of the sample 7 by the camera head 3. The shooting condition for changing the settings can be one or more of exposure, exposure time, and white balance, but the settings of other shooting conditions can be changed. The selection of the shooting condition for changing the settings and a change width when the selected shooting condition is changed can be predetermined by the observer.

Since the subsequent process in S311 is the same as the process in S109 shown in FIG. 2, the detailed descriptions are omitted here.

By performing these processes, the auto-bracket shooting can be performed by the camera head 3 when both completion of the sighting on an observed portion of the sample 7 and completion of the focusing are detected. As a result, in addition to the effect of the first embodiment, various images having different shooting conditions can be automatically acquired, thereby compensating for the failure in shooting by erroneous settings of shooting conditions by an observer, and improving the operability in shooting microscope images.

Described next is the microscope image shooting system according to the second embodiment. In the present embodiment, the completion of the sighting on an observed portion of the sample 7 is detected by detecting the change of the outline of the sample images in a time series acquired by sequentially shooting scaled up images of the sample 7 by the camera head 3 continuously staying in a predetermined range for a predetermined time.

Figure 11:
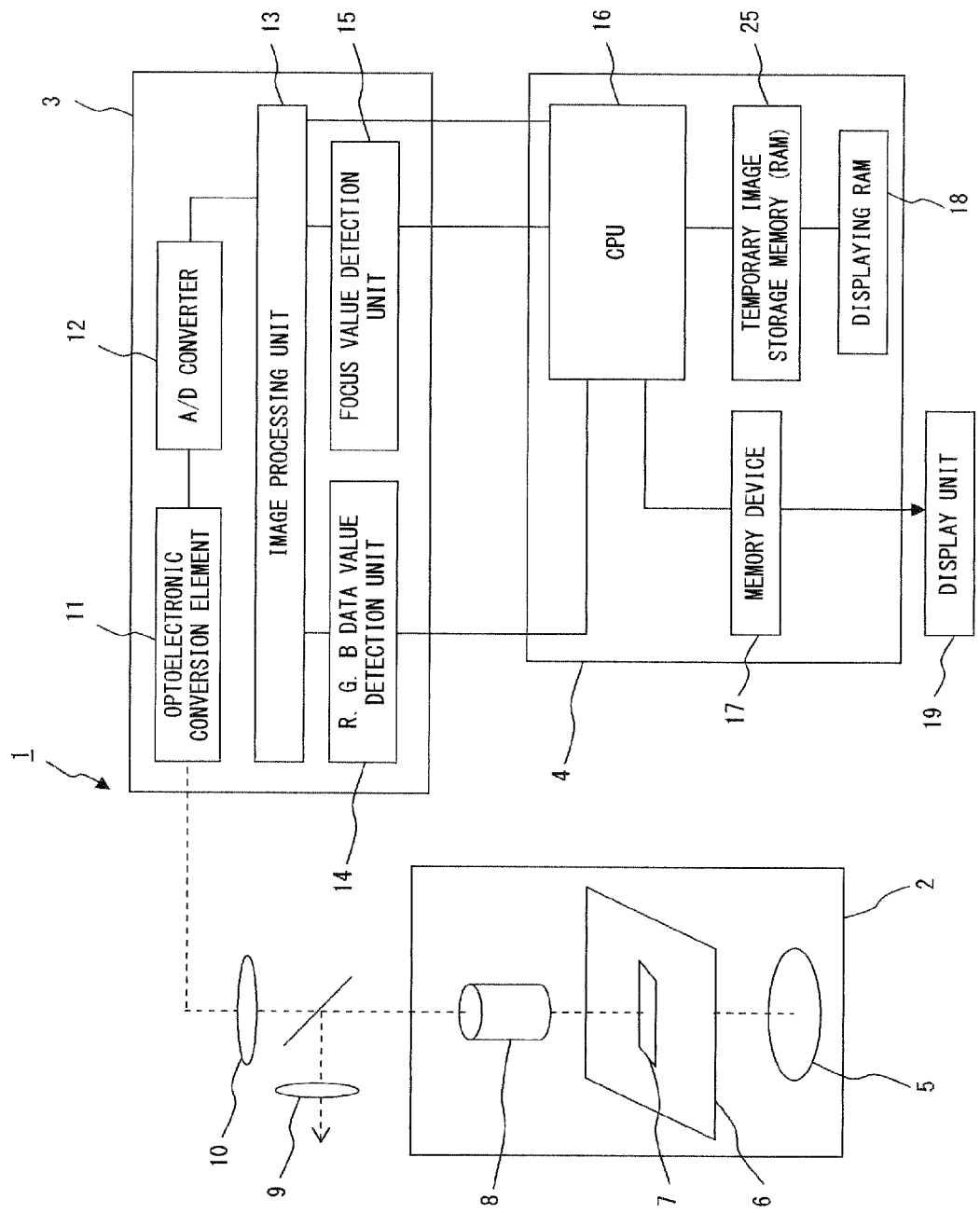
FIG. 11 shows the configuration of the microscope image shooting system according to the second embodiment of the present invention.

Described below is the configuration shown in FIG. 11. FIG. 11 shows the configuration of the microscope image shooting system according to the second embodiment of the present invention.

The microscope image shooting system 1 according to the present embodiment is configured by the microscope body 2, the camera head 3, the control unit 4, and the display unit 19. The camera head 3 and the control unit 4 configure the shooting apparatus for a microscope embodying the present invention.

The configuration shown in FIG. 11 is different from the configuration of the first embodiment shown in FIG. 1 only in that the control unit 4 includes temporary image storage memory 25. Only the difference point is described below.

The temporary image storage memory 25 is connected to the CPU 16, stores the digital image data generated by the image processing unit 13, and can read the stored digital image data. In addition it also transmits the stored digital image data to the memory device 18 and stores the data on a record medium.

Described next is the flowchart shown in FIG. 12. FIG. 12 is a flowchart showing the process contents of the automatic shooting mode process performed by the CPU 16 of the control unit 4 in the microscope image shooting system 1 shown in FIG. 11. Only S403 shown in FIG. 12 indicates the operation performed by an observer.

The CPU 16 can perform the process by reading and executing the control program stored in its own ROM.

The process shown in FIG. 12 is started when an observer operates the control unit 4 and the CPU 16 acquires an instruction to select the automatic shooting mode as an operation mode.

First, in S401 shown in FIG. 12, performed is the process of monitoring the focus values of scaled up images in a time series acquired by the camera head 3 sequentially shooting displayed live microscope images, that is, scaled up images of the sample 7 obtained by the microscope body 2. The focus values can be similarly performed as with the monitoring process in S101 shown in FIG. 2.

In S402, the camera head 3 is controlled for each predetermined time, the scaled up images of the sample 7 are sequentially shot to obtain the scaled up image, the digital image data of the acquired sample image in a time series is transferred from the image processing unit 13 to the temporary image storage memory 25, and is temporarily stored therein.

Next, in S403, an observer moves the stage 6 of the microscope body 2 to perform sighting on an observed portion of the sample 7.

In S404, it is determined whether or not the sample images acquired continuously by the camera head 3 in the sample images represented by the digital image data temporarily stored in the temporary image storage memory 25 in the process in S402 indicate the same images. If it is determined that the continuously acquired sample images indicate the same images (YES as a determination result), then control is passed to S405. On the other hand, if it is determined that the continuously acquired sample images are not the same images (NO as a determination result), it is assumed that the operation for focusing on an observed portion has not been completed, and the process is repeated until the determination result becomes YES.

The determining process in S404 is practically performed as follows. That is, the two sample images stored immediately before (an n-th sample image and an (n−1)th sample image) are read from the temporary image storage memory 25. Next, the outline information about the two sample images are extracted and superposed to determine whether or not the outlines of the two sample images match each other. When the positions, sizes, and shapes of the superposed outlines match each other, it is assumed that the outlines match each other, thereby determining that the continuously acquired sample images are the same images. Thus, it is recognized that the stage 6 has stopped after shooting the (n−1)th image until the n-th image is shot, thereby determining on the basis of the determination result that the operation for the operation for sighting on an observed portion has completed.

An observer is allowed to set the time intervals of the shooting operation by the camera head 3 in the process in S402. Thus, the operation efficiency of the observer can be improved by adjusting the time settings on the basis of the operation method and liking of the observer. It can be also determined in the process in S404 that the two sample images match each other when changes of the outlines of sample images in a time series remain in a predetermined range in addition to the case when the positions, sizes, and shapes completely match.

Since the processes in the subsequent S405 through S408 are the same as the processes in S104 through A107 shown in FIG. 2, the detailed descriptions are omitted here.

Next, in S409, the memory device 18 is controlled to record on a record medium digital image data temporarily stored in the temporary image storage memory 25, that is digital image data representing a sample image acquired by the shooting operation by the camera head 3. In S409, the camera head 3 can be controlled to acquire a sample image by shooting a scaled up image of the sample 7, and the memory device 18 can be controlled to receive the digital image data of the acquired sample image from the image processing unit 13 and record the data therein.

By performing the above-mentioned processes according to the present embodiment, the completion of the sighting on an observed portion of the sample 7 is detected on the basis of the changes of the outline of the acquired sample image. Therefore, in addition to the effect of the above-mentioned first embodiments, the sample 7 for which a determination using an R. G. B data value is difficult for similar pale colors of the sample 7 etc. can be successfully determined. Thus, since the operation time of the shooting apparatus in shooting a microscope image can be shortened, the time required for the shooting operation can be shortened.

Described next is the microscope image shooting system according to the third embodiment of the present invention. In the present embodiment, an extend focus image (hereinafter referred to as an "EFI" for short) of the sample 7 can be acquired without the camera head 3 and the control unit 4 by an observer operating only the microscope body 2.

Figure 13:
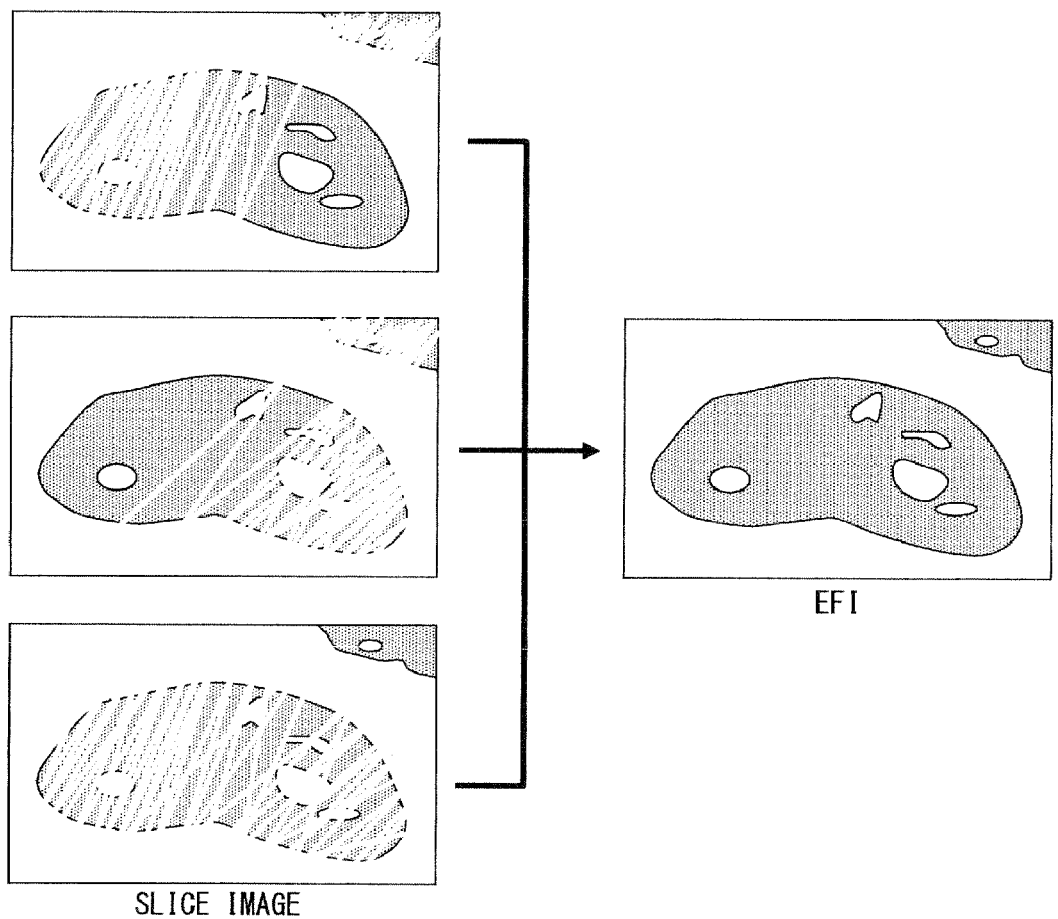
FIG. 13 is an explanatory view showing the method of generating an EFI.

An EFI is an image obtained by sequentially shooting scaled up images of the sample 7 while changing the focus position of the object lens 8 with respect to the sample 7, acquiring a plurality of slice images of the sample 7 as sample images, and combining the plurality of acquired images. In the combination, as shown in FIG. 13, the image of the portion in focus is extracted from each slice image, the image of the extracted portion is combined, thereby acquiring an EFI. Therefore, a thick sample 7 normally causing an out-of-focus result (erroneous focusing) on a part of the acquired sample image can provide a sample image in focus on all parts of the sample 7 using the EFI.

Figure 14:
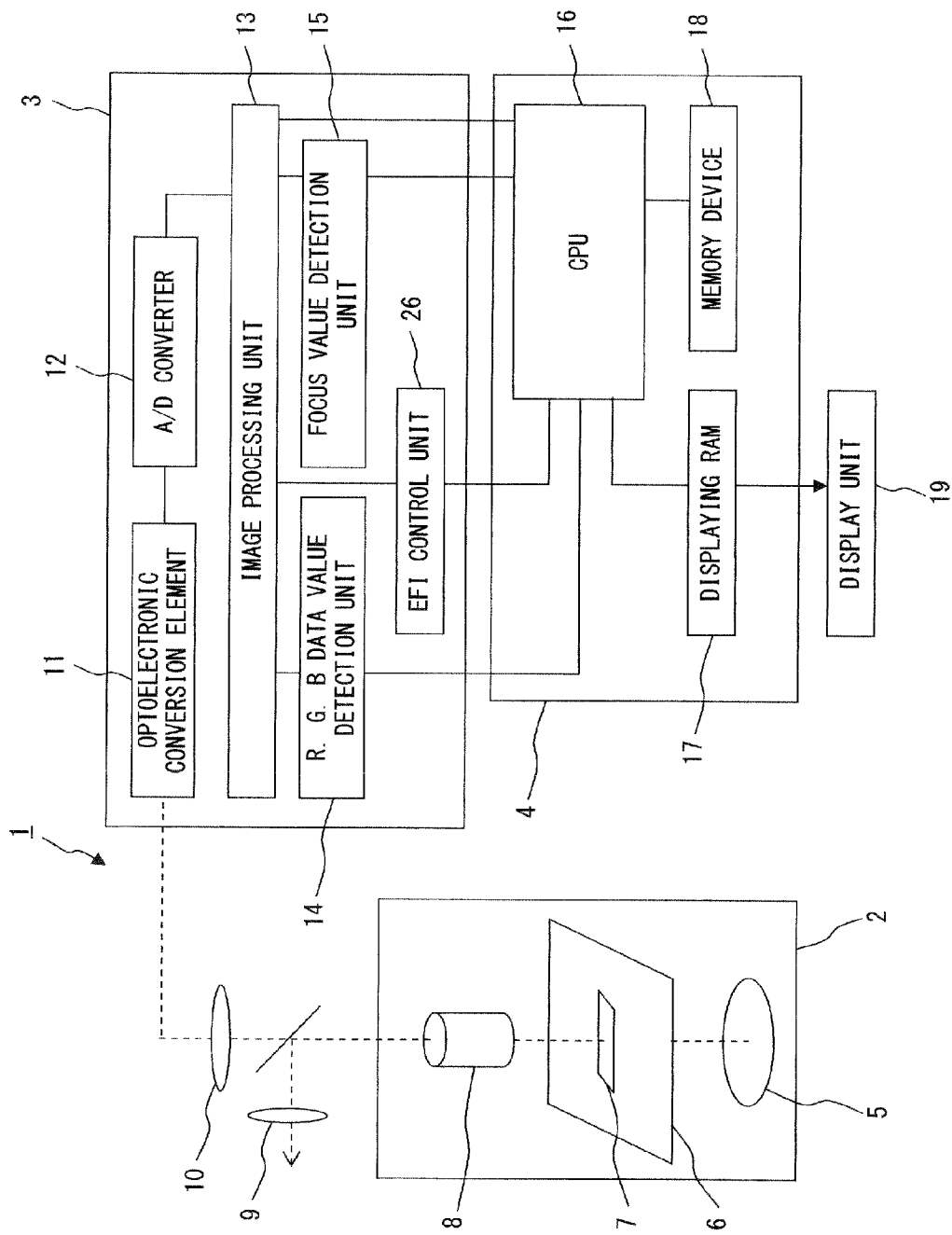
FIG. 14 shows the configuration of the microscope image shooting system according to the third embodiment of the present invention.

The configuration shown in FIG. 14 is described below. FIG. 14 shows the configuration of the microscope image shooting system according to the third embodiment of the present invention.

The microscope image shooting system 1 according to the present embodiment is configured by the microscope body 2, the camera head 3, the control unit 4, and the display unit 19. The shooting apparatus for a microscope for embodying the present invention is configured by the camera head 3 and the control unit 4.

The configuration shown in FIG. 14 is different from the configuration according to the first embodiment shown in FIG. 1 only in that the camera head 3 is provided with an EFI control unit 26. Described below are only the different points.

The EFI control unit 26 is connected to the image processing unit 13 and the CPU 16, and controls shooting for acquiring an EFI in shooting a microscope image by the camera head 3.

Figure 15:
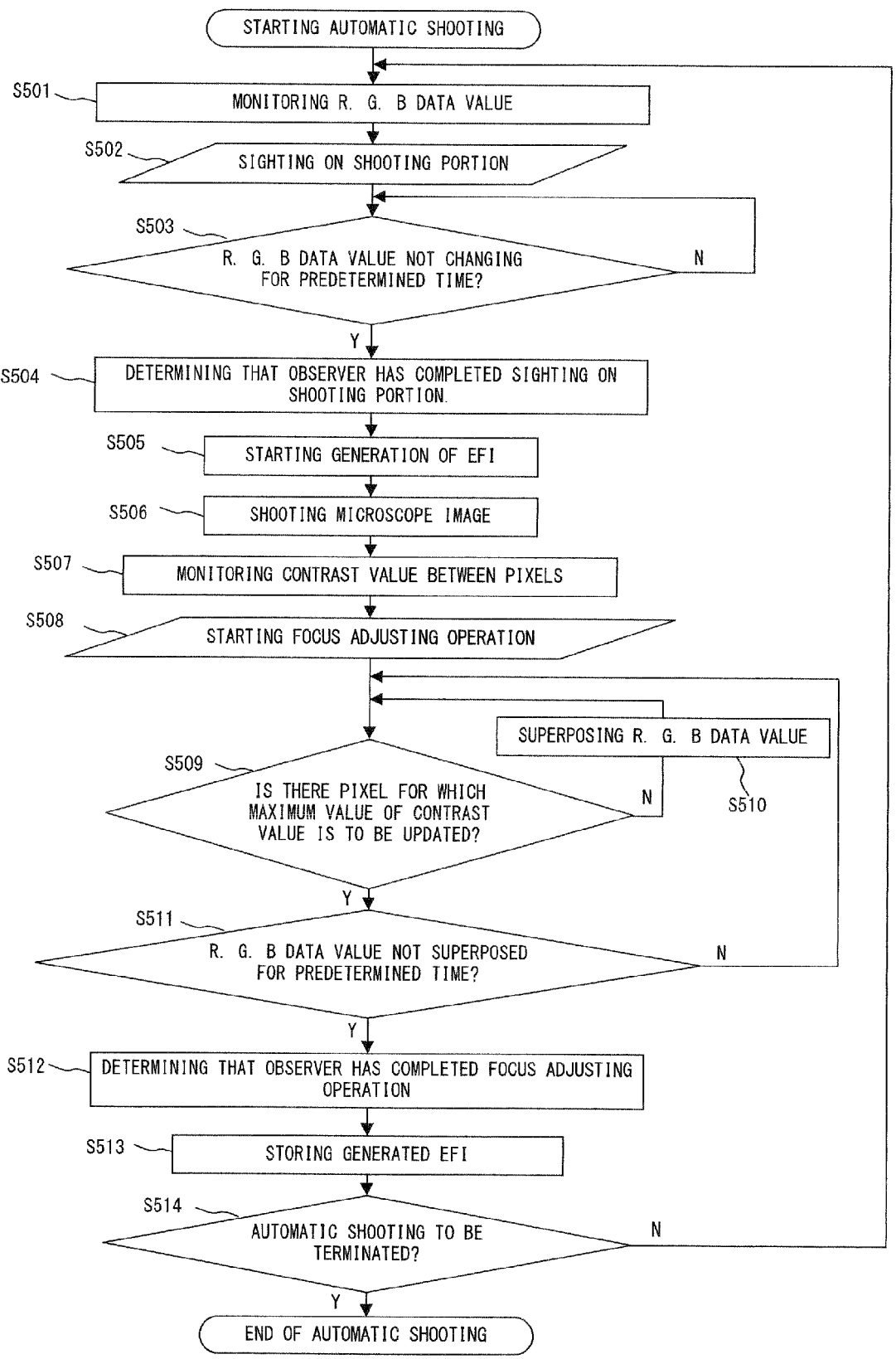
FIG. 15 is a flowchart showing the process contents of the fifth example of the automatic shooting mode process.

Described below is the flowchart shown in FIG. 15. FIG. 15 is a flowchart showing the process contents of the automatic shooting mode process performed by the CPU 16 of the control unit 4 in the microscope image shooting system 1 shown in FIG. 14. The operations in S502 and S508 shown in FIG. 15 are performed by an observer.

First, in S501 shown in FIG. 15, performed is the process of monitoring the R. G. B data value of scaled up images in a time series acquired by the camera head 3 sequentially shooting displayed live microscope images, that is, scaled up images of the sample 7 obtained by the microscope body 2. The R. G. B data value can be similarly performed as with the monitoring process in S101 shown in FIG. 2.

Since the processes in S502 through S504 are the same as the processes in S102 through S104 shown in FIG. 2, the detailed descriptions are omitted here. In S504, it is not necessary to perform the process of temporarily resetting the maximum value of the focus value stored in the CPU 16. In the processes up to this stage, the completion of the sighting on a predetermined portion of the sample 7 is detected.

Next, in S505, the process for acquiring an EFI is started, the camera head 3 is controlled in S506, and a sample image is acquired by sequentially shooting the sample 7 obtained by the microscope body 2. The shooting process in S506 is performed concurrently with the process in S507 through S513.

Next, in S507, each time the camera head 3 acquires a sample image in the controlling process in S506, the contrast value of each unit of the sample image is monitored. In the monitoring, all pixels configuring a sample image are monitored using a differentiation value of an intensity value (difference between an adjacent pixel and an intensity value) as a contrast value. At this time, the CPU 16 stores the maximum value of the contrast value for each pixel in the same position in a microscope image.

On the other hand, in S508, an observer performs a focus adjusting operation for changing a relative distance between the stage 6 and the object lens 8 of the microscope body 2 to move the focal position of the object lens 8 over the entire direction of the optical axis for the sample 7 having the thickness in the direction of the optical axis of the microscope body 2.

In S509, it is determined whether or not there is a pixel for which the maximum value of the contrast value of each pixel stored in the CPU 16 is to be updated. When it is determined that there is a pixel for which the maximum value of the contrast value is to be updated (YES as a determination result), control is passed to S510. On the other hand, if it is determined that there is no pixel for which the maximum value of the contrast value is to be updated (YES as a determination result) control is passed to S511.

In S510, the R. G. B data value of the pixel for which the maximum value of the contrast value is updated is overwritten in a predetermined storage area in the displaying RAM 17 as a R. G. B data value of the pixel in the same position in an EFI. Afterwards, control is returned to step to S509, and the above-mentioned processes are performed again.

In the processes in S509 and S510, a pixel having the highest contrast is extracted from among the pixels in the same position of the sample images in a time series, and the extracted pixel is arranged in the position to form one composite image.

Next, in S511, it is determined whether or not the overwriting of the R. G. B data value of the EFI in S510 is performed for a predetermined time. If it is determined that the overwriting of the R. G. B data value of the EFI has not been performed for a predetermined time (YES as a determination result), it is assumed that new extraction of a pixel having the highest contrast has not been profile for a predetermined time, and control is passed to S512. On the other hand, if it is determined that the overwriting of the R. G. B data value of the EFI has been performed for a predetermined time (NO as a determination result), control is returned to S509 and the above-mentioned processes are performed again.

The setting of the predetermined time in the process in S511 for determining whether or not the superposition of the R. G. B data value of the EFI has been performed for a predetermined time is arbitrarily set by an observer. Thus, the time setting is adjusted on the basis of the operating method and liking of an observer, thereby improving the operation efficiency of the observer.

In S512, it is assumed that the moving operation of the focal position by an observer has been completed. In S513, the memory device 18 is controlled and the R. G. B data value of the EFI stored in the displaying RAM 17 is recorded on a record medium.

Next, in S513, it is determined whether or not the microscope image shooting system 1 has received an instruction to terminate automatic shooting as an instruction issued by an observer using the control unit 4. When it is determined that the instruction has been received (YES as a determination result), the automatic shooting mode process is terminated. On the other hand, if it is determined that the instruction has no been received (NO as a determination result), control is returned to S501, and the above-mentioned processes are repeated.

The above-mentioned processes are the automatic shooting mode process. By performing the process, an EFI of the sample 7 can be acquired without operating the camera head 3 and the control unit 4 only by an observer operating the microscope body 2.

In the processes performed as described above according to the present embodiment, a totally clear image can be easily and quickly obtained without erroneous focusing although a thick sample 7 is shot. Thus, the operation time of a shooting apparatus in shooting a microscope image can be shortened, thereby practically shortening the time required to perform a shooting operation.

The present embodiment of the present invention is described above, but the present invention is not limited to each of the above-mentioned embodiments, and various improvements and variations can be realized within the scope of the gist of the present invention.

What is claimed is:

1. A shooting apparatus for a microscope, comprising:
   a shooting unit which acquires a sample image by shooting a scaled up image of a sample obtained by a microscope;
   a recording unit which records the sample image;
   a sighting completion detection unit which detects completion of sighting on an observed portion of the sample by the microscope;
   a focusing completion detection unit which detects completion of focusing on the observed portion by the microscope; and
   a control unit which records the sample image acquired by the shooting unit in the recording unit when both completion of the sighting and completion of the focusing are detected;
   wherein the sighting completion detection unit detects the completion of the sighting by detecting that an amount of change of an image in a predetermined sighting completion detection area in the sample image in a time series acquired by sequentially performing the shooting by the shooting unit continuously stays in a predetermined range for a predetermined time.

2. The apparatus according to claim 1, wherein the sighting completion detection unit detects the completion of the sighting by detecting that an amount of change of at least one of three primary color components of light of a pixel configuring an image in the predetermined sighting completion detection area continuously stays in the predetermined range for the predetermined time.

3. A shooting apparatus for a microscope, comprising:
   a shooting unit which acquires a sample image by shooting a scaled up image of a sample obtained by a microscope;
   a recording unit which records the sample image;
   a sighting completion detection unit which detects completion of sighting on an observed portion of the sample by the microscope;
   a focusing completion detection unit which detects completion of focusing on the observed portion by the microscope; and
   a control unit which records the sample image acquired by the shooting unit in the recording unit when both completion of the sighting and completion of the focusing are detected;
   wherein the sighting completion detection unit detects the completion of the focusing by detecting that, after detecting the completion of the sighting, contrast of an image in a predetermined focus completion detection area of the sample image in a time series acquired by the shooting unit sequentially performing shooting continuously stays in a predetermined range from a highest contrast for a predetermined time.

4. A shooting apparatus for a microscope, comprising:
   a shooting unit which acquires a sample image by shooting a scaled up image of a sample obtained by a microscope;
   a recording unit which records the sample image;
   a sighting completion detection unit which detects completion of sighting on an observed portion of the sample by the microscope;
   a focusing completion detection unit which detects completion of focusing on the observed portion by the microscope; and
   a control unit which records the sample image acquired by the shooting unit in the recording unit when both completion of the sighting and completion of the focusing are detected;
   wherein, when both completion of the sighting and completion of the focusing are detected, the control unit further controls auto-bracket shooting control for sequentially shooting by the shooting unit while changing a setting of shooting conditions in the shooting performed by the shooting unit.

5. The apparatus according to claim 4, wherein the shooting conditions are at least one of exposure, an exposure time, and white balance.

6. A shooting apparatus for a microscope, comprising:
   a shooting unit which acquires a sample image by shooting a scaled up image of a sample obtained by a microscope;
   a recording unit which records the sample image;
   a sighting completion detection unit which detects completion of sighting on an observed portion of the sample by the microscope;

a focusing completion detection unit which detects completion of focusing on the observed portion by the microscope; and a control unit which records the sample image acquired by the shooting unit in the recording unit when both completion of the sighting and completion of the focusing are detected;

wherein the sighting completion detection unit detects interference of the sighting by detecting that a change of outlines of sample images in a time series acquired by sequentially shooting by the shooting unit continuously stays in a predetermined range for a predetermined time.

7. A shooting apparatus for a microscope, comprising:

a shooting unit for acquiring a sample image by shooting a scaled up image of a sample obtained by a microscope;

a sighting completion detection unit detecting completion of sighting on an observed portion of the sample by the microscope;

a focal position moving operation completion detection unit detecting completion of a moving operation of a focal position on the sample;

a control unit for sequentially acquiring the sample image in a time series by allowing the shooting unit to sequentially shoot an image when completion of the sighting is detected; and a composite image generation unit extracting a pixel having highest contrast from among pixels in the same position among the sample images in the time series acquired by the shooting unit by detection of the completion of the moving operation of the focal position, arranging the extracted pixel in the position, and generating a composite image.

8. The apparatus according to claim 7, wherein the focal position moving operation completion detection unit detects the completion of the moving operation of the focal position by detecting that new extraction of a pixel having highest contrast has not been performed in the extraction concurrently performed with acquisition of sample images in the time series by the shooting unit.

* * * * *